(12) United States Patent
Kreindl et al.

(10) Patent No.: US 10,519,057 B2
(45) Date of Patent: Dec. 31, 2019

(54) METHOD FOR THE PRODUCTION OF AN OPTICAL GLASS ELEMENT

(71) Applicant: EV Group E. Thallner GmbH, St. Florian am Inn (AT)

(72) Inventors: Gerald Kreindl, Scharding (AT); Mustapha Chouiki, Linz (AT)

(73) Assignee: EV Group E. Thallner GmbH, St. Florian am Inn (AT)

( * ) Notice: Subject to any disclaimer, the term of this patent is extended or adjusted under 35 U.S.C. 154(b) by 91 days.

(21) Appl. No.: 15/509,874

(22) PCT Filed: Aug. 27, 2015

(86) PCT No.: PCT/EP2015/069667
§ 371 (c)(1),
(2) Date: Mar. 9, 2017

(87) PCT Pub. No.: WO2016/045907
PCT Pub. Date: Mar. 31, 2016

(65) Prior Publication Data
US 2017/0297943 A1    Oct. 19, 2017

(30) Foreign Application Priority Data
Sep. 24, 2014   (DE) .................. 10 2014 113 854

(51) Int. Cl.
*C03B 19/12* (2006.01)
*G02B 3/00* (2006.01)

(52) U.S. Cl.
CPC ............ *C03B 19/12* (2013.01); *G02B 3/0031* (2013.01)

(58) Field of Classification Search
CPC . C03B 11/082; C03B 19/12; C03B 2215/412; B29C 33/42; B29C 33/424
See application file for complete search history.

(56) References Cited

U.S. PATENT DOCUMENTS

| 4,234,330 A * | 11/1980 | Taupin ............... C03B 19/1085 65/21.4 |
| 4,680,049 A | 7/1987 | Onorato et al. |
| 5,250,096 A * | 10/1993 | Bruce .................. C03B 37/016 423/338 |
| 5,991,493 A | 11/1999 | Dawes et al. |
| 6,360,564 B1 | 3/2002 | Cornelius et al. |
| 2001/0003910 A1* | 6/2001 | Oh ........................ C03B 19/12 65/17.2 |
| 2004/0079114 A1* | 4/2004 | Aitken ................. C03B 11/082 65/64 |

(Continued)

FOREIGN PATENT DOCUMENTS

| CN | 1245563 A | 2/2000 |
| CN | 1423623 A | 6/2003 |

(Continued)

OTHER PUBLICATIONS

International Search Report from corresponding International Patent Application No. PCT/EP2015/069667, dated Nov. 11, 2015.

*Primary Examiner* — Cynthia Szewczyk
(74) *Attorney, Agent, or Firm* — Kusner & Jaffe

(57) ABSTRACT

A method for the production of an optical glass element, with the following process sequence: a) applying a liquid embossing material on an embossing die, b) embossing the embossing material at a temperature of less than 500° C., c) hardening the embossing material, d) sintering the embossing material and thus executing the primary forming of the optical glass element. In addition, an optical glass element that is produced with the method, a device for implementing the method, and a use of this device are disclosed.

17 Claims, 2 Drawing Sheets

(56) References Cited

U.S. PATENT DOCUMENTS

| | | | |
|---|---|---|---|
| 2005/0093202 A1* | 5/2005 | Yokoyama | B29C 33/424 264/224 |
| 2005/0206034 A1* | 9/2005 | Yokoyama | B29C 33/3842 264/219 |
| 2006/0081012 A1 | 4/2006 | Park et al. | |
| 2007/0272685 A1* | 11/2007 | Schreiber | C03B 19/01 220/2.1 R |
| 2010/0291256 A1 | 11/2010 | Lee | |
| 2012/0175558 A1* | 7/2012 | Conzone | C03B 19/102 252/301.4 R |
| 2015/0130095 A1 | 5/2015 | Kast | G02B 13/0085 |
| 2016/0136873 A1 | 5/2016 | Chouiki | B29C 50/005 |

FOREIGN PATENT DOCUMENTS

| | | | | |
|---|---|---|---|---|
| CN | 101885577 A | 11/2010 | | |
| DE | 195 34 764 A1 | 3/1997 | | C04B 35/14 |
| DE | 102 17 089 A1 | 10/2003 | | B81C 1/00 |
| DE | 10 2004 113 854 A1 | 3/2016 | | C03B 19/06 |
| FR | 2 712 280 A1 | 5/1995 | | C03B 23/203 |
| FR | 2 712 280 A1 | 5/1995 | | |
| JP | S63-236724 A | 10/1988 | | |
| JP | H03-37121 | 2/1991 | | |
| JP | 2008-162190 A | 7/2008 | | |
| JP | 2009-120444 A | 6/2009 | | C03B 20/00 |
| JP | 2009-120444 A | 6/2009 | | |
| KR | 2003-0022954 A | 3/2003 | | |
| WO | WO-98/26315 A1 | 6/1998 | | |
| WO | WO 1998/026315 A1 | 6/1998 | | G02B 6/10 |
| WO | WO-1999/06873 A2 | 2/1999 | | |
| WO | WO 2000/010929 A1 | 3/2000 | | C03B 8/02 |
| WO | WO-2000/10929 A1 | 3/2000 | | |
| WO | WO-01/53223 A1 | 7/2001 | | |
| WO | WO 2003/086959 A2 | 10/2003 | | B81C 1/00 |
| WO | WO 2013/178263 A1 | 12/2013 | | B29D 11/00 |
| WO | WO 2014/202127 A1 | 12/2014 | | G03F 7/00 |
| WO | WO 2016/045907 A1 | 3/2016 | | C03B 19/12 |

* cited by examiner

METHOD FOR THE PRODUCTION OF AN OPTICAL GLASS ELEMENT

FIELD OF INVENTION

The invention relates to a method and a device for the production of an optical glass element, an optical glass element and a use of such a device for the production of an optical glass element.

BACKGROUND OF INVENTION

In recent years, an increasing miniaturization of electronic and optical structural elements has taken place. In particular, the so-called mobile devices, i.e., electronic devices such as smartphones, mobile phones, notebooks and tablets, which have an increasingly greater electronic and optical functional range, are the driving force behind this development. The optical elements include at least one lens, but very often even of multiple lenses that are stacked on one another and that project the light beams onto an image sensor. In this case, the greatest value must be placed on the quality of the optical elements in order to obtain an image that is as sharp and undistorted as possible.

In principle, optical elements for the visible light spectrum can be manufactured from glass, in particular from $SiO_2$, or from polymers. Glass is primarily suitable based on its excellent optical properties, especially because of its refraction index, specifically for the production of such lenses.

Nevertheless, to date, lenses for mobile devices are still produced predominantly from polymers. Polymers are embossed simply by an embossing process and a special die to form the desired lens shape and therefore to date still represent the preferred material for the lens production. In addition, the injection-molding technique is still widely used in the production of such lenses.

There are two large groups of production processes for the mass production of optical elements.

The first production process makes possible the embossing of multiple optical elements in a single embossing step. This group of production processes can in turn be divided into a subgroup of production processes that require a carrier substrate in order to emboss multiple, individual optical elements and into a subgroup that can completely dispense with a carrier substrate, since the optical elements are part of a so-called monolithic substrate that is produced in a completely interconnecting manner and in an embossing step between two dies. A monolithic substrate is thus defined as an embossing product, in which all embossed optical elements are connected to one another and form a large interconnecting field of optical elements. Since the optical elements are predominantly lenses and the substrates are in most cases circular, the embossing product is in most cases referred to as a monolithic lens wafer.

In the second group of production processes, multiple optical elements are not produced by a single embossing step but rather are produced individually, by a so-called step-and-repeat process. With this production process, the embossing of multiple, individual optical elements is possible. The optical elements are not connected to one another. In most cases, the optical elements are embossed directly on a carrier substrate. The optical elements can also be tightly connected to the carrier substrate, by which the carrier substrate obtains a functional property. The carrier substrate is then cut in a separating process along the free spaces between the optical elements. After the separating process, multiple composite optical elements comprised of a carrier substrate part and an optical element embossed thereon are obtained. This type of production process as well as the products developed therefrom are not discussed in more detail, however, in this patent specification.

In a third group of production processes, the embossing material is applied individually in multiple positions of a carrier substrate. Accordingly, a full-surface embossing process, which embosses the individual embossing materials specifically in the respective shapes but does not lead to a merging of the embossing materials, is carried out. As a result, it is possible to produce multiple optical elements at the same time on a carrier substrate. Such a process is described very precisely in the publication WO2013/178263A1.

Glass is actually defined as the very broad and general class of materials of amorphous, at times also partially crystalline, materials that are frozen in their glass-like state by a special production process.

While the production of macroscopic optical elements, in particular lenses, from glass for optical devices such as cameras, binoculars or telescopes in principle no longer represents a major challenge, the corresponding production of very small lenses from glass is to this day extremely problematic. The reason for this primarily lies in the fact that larger optical elements are ground predominantly from glass semi-finished products. The shaping is thus predominantly performed in the cold state. Such a shaping of optical elements, in particular lenses, is hardly feasible in the millimeter or micrometer range, however. In addition, conventional production methods for lenses that are used in modern devices are too expensive. In addition, in the industries of semiconductors, electronics and optics, the already mentioned monolithic substrates, therefore substrates of interconnecting optical elements, are preferred. A production of such a monolithic glass substrate is also extremely difficult with conventional methods. The use of a fully-automated micromilling cutter that processes a corresponding glass semi-finished product would be conceivable. This process has much too small a throughput, however, and therefore is not suitable for mass production. In addition, the surface of the optical elements on the glass substrate would be much too rough. The extreme roughness has a negative influence on the optical properties of the optical elements and is therefore to be avoided in principle or to be reduced to a minimum.

Nevertheless, in the industry, there exists a production process for monolithic glass substrates that is suitable for mass use. This is based on an etching technique, however, and not on mechanical fabrication. Below, the state of the art is explained in more detail relative to this etching technique in order to show how complicated, production-intensive and expensive the current manufacturing of monolithic glass substrates is.

In a first partial step, the coating of a selected glass substrate is carried out with a metal layer. In a second partial step, the metal layer is then coated with a photoresist, which, in a third partial step, has to be correspondingly structured by a mask and a photolithographic process. Then, the photoresist is removed by chemicals at the necessary spots and opens up access to the metal layer. In a sixth partial step, the structural transfer into the metal layer is carried out, followed by the removal of the photoresist. The metal layer is now used as a mask for the structuring of the actual glass substrate. The glass substrate is then etched by relatively toxic chemicals. In the last process step, the removal of the metal layer is finally carried out, in most cases in turn by other chemicals.

The necessary process steps for the structuring of such a glass substrate are extremely production-intensive, time-intensive, costly, and, primarily, based on chemicals that are very dangerous and toxic, and immensely harmful to the environment. In addition, a process that is complicated to such an extent with many partial steps is very susceptible to flaws.

In conclusion, it can be stated that in the state of the art, no noteworthy process, most particularly one suitable for mass use, yet exists for the production of monolithic glass substrates, in particular monolithic glass lens wafers, that be implemented economically, simply, and with as few chemicals as possible.

It is therefore the object of this invention to make available an improved method for the production of optical glass elements.

SUMMARY OF INVENTION

The object of the present invention is achieved with the method according to the invention defined by the independent claim(s).

Advantageous further developments of the invention are indicated in the subclaims. All combinations of at least two of the features indicated in the specification, the claims and/or the figures also fall within the scope of the invention. In the indicated ranges of values, values as boundary values that lie within the above-mentioned limits are also to be considered as disclosed and can be claimed in any combination.

The invention relates to a method for the production of an optical glass element, in particular multiple optical glass elements, with the following process sequence:
 a) Applying a liquid embossing material on an embossing die, in particular an embossing die surface and/or a substrate of the embossing die,
 b) Embossing the embossing material at a temperature of less than 500° C.,
 c) Hardening the embossing material,
 d) Sintering the embossing material and thus executing the primary forming of the optical glass element, in particular the optical glass elements.

According to the invention, steps a, b, c and d in particular occur one after the other in time. In a special embodiment, steps c and d can be performed simultaneously, in particular in the same unit. This is the case in particular for embossing materials that can be thermally hardened.

It is preferably provided that the embossing is carried out in step b) at a temperature that is less than 400° C., preferably less than 300° C., more preferably less than 200° C., even more preferably less than 100° C., and most preferably at ambient temperature. With ambient temperature (also called room temperature), a temperature is meant that lies between 10° C. and 30° C., in particular between 15° C. and 25° C. The embossing can advantageously be carried out at comparatively low temperatures, in particular at ambient temperature, which significantly simplifies the embossing.

It is further preferably provided that after step a), the degree of coverage of the embossing die surface is more than 20%, preferably more than 40%, more preferably more than 60%, most preferably more than 80%, and with utmost preference 100%.

According to another preferred embodiment, the embossing material is applied on the embossing die surface in the form of multiple small, distributed drops. As a result, it is advantageously possible to achieve an especially homogeneous distribution of the embossing material or to produce multiple optical elements that lie beside one another but separate from one another.

It is further preferably provided that the embossing of the embossing material is carried out in step b) by a converging of the, in particular a lower, embossing die and/or another, in particular an upper, embossing die. It can be provided in particular that the embossing material is applied from above on the lower embossing die, and the upper embossing die approaches the lower embossing die from above. The upper embossing die and/or the lower embossing die can be designed in a movable manner, in particular parallel to the vertical.

It can be provided in particular that the hardening of the embossing material is carried out in step c) by a thermal method, whereby heat is transported to the embossing material, whereby a polymerization process of the embossing material starts above a critical temperature $T_k$. The critical temperature in this case lies between 0° C. and 1,000° C., preferably between 10° C. and 750° C., even more preferably between 20° C. and 500° C., most preferably between 30° C. and 250° C., and all the more preferably between 50° C. and 200° C.

As an alternative, it can be provided that the hardening of the embossing material can be carried out in step c) by an electromagnetic method, whereby the embossing material is irradiated by an electromagnetic radiation, in particular UV light, whereby the wavelength range of the electromagnetic radiation lies between 1 nm and 10,000 nm, preferably between 10 nm and 1,000 nm, more preferably between 100 nm and 500 nm, and most preferably between 200 nm and 500 nm.

According to another preferred embodiment, steps a), b) and c) are performed in an embossing device, and the sintering in step d) is performed in a sintering device that is separated from the embossing device, arranged preferably outside of the embossing device. As a result, a parallel processing is advantageously possible. In particular, multiple substrates can be thermally treated at the same time in a sintering furnace. By the thermal treatment of multiple substrates in a sintering furnace, the production of the glass element or the glass elements can advantageously be carried out more quickly.

It is further preferably provided that the sintering is carried out in step d) by microwave radiation. As an alternative, it can be provided that the sintering is carried out in step d) in a furnace, preferably in a continuous furnace, whereby the temperature during sintering is greater than 50° C., preferably greater than 100° C., more preferably greater than 300° C., even more preferably greater than 500° C., especially more preferably greater than 700° C., and most preferably greater than 900° C.

According to another preferred embodiment, it is provided that the embossing material has at least one of the following components and/or combinations of the following components:
 Polyhedral oligomeric silsesquioxane (POSS),
 Polydimethylsiloxane (PDMS),
 Tetraethyl orthosilicate (TEOS),
 Poly(organo)siloxane (silicone).

Another subject of this invention relates to an optical glass element, produced with a method according to one of the preceding embodiments.

Another subject of this invention relates to a device for implementing a method according to one of the preceding embodiments.

Another subject of this invention relates to a use of a device according to one of the preceding embodiments for the production of an optical glass element.

The invention relates in particular to a process (a method) of producing optical elements comprised of glass (optical glass elements, designed in particular as a monolithic substrate), in particular glass lenses, especially preferably a monolithic glass lens substrate, by an imprint process at temperatures of less than 500° C., in particular at ambient temperature.

According to the invention, glass is defined in particular as the ceramic glass that is comprised of silicon dioxide, as well as its various variants.

In this case, the invention is based on the idea of using an embossing material that can be formed at temperatures of less than 500° C., in particular at ambient temperature, which material can be converted by chemical and/or physical processes into at least approximately pure silicon dioxide. A significant aspect according to the invention is in particular the reduction, in particular the specifically controllable reduction, of the surface roughness and thus an increase in the glass lens quality of the monolithic glass lens substrate. In addition, in particular an efficient method for sintering the embossing material or the substrate in particular by means of microwaves is disclosed.

Sintering is defined according to the invention in particular as the conversion of the, in particular viscous, embossing material into a hard, cross-linked material. The sintering process results in particular in a very compact material with a correspondingly high density. The sintering process is characterized by a physical and/or chemical conversion of the embossing material. In the case of a chemical conversion, the sintering process is accompanied in particular by the generation of gases, which are expelled from the sintering element in order to obtain a compact end product that is in particular free of flaws. Since most embossing materials are comprised of organic and/or organo-silica-based materials, the sintering process very often accompanies the generation of carbon dioxide and/or carbon monoxide and/or water. In addition, preferably before and/or during the sintering process, gases and/or additives, which were added to the embossing material, are evaporated or otherwise removed from the embossing material. According to the invention, a removal of such additives and/or all gases that are produced during the process according to the invention is preferred before the sintering process, at the latest during the sintering process, and at the very latest shortly before completion of the sintering process, in order not to retain any unwanted products, in particular gases, in the end product according to the invention, which can be responsible for a pore formation. The sintering process is preferably combined with a reduction in the residual stress in the embossing material or the end product. The parameters for the sintering process are therefore to be selected in particular in such a way that the residual stress in the end product, in particular a monolithic lens wafer, exhibits a specific residual stress.

The meaning of ambient temperature is a temperature that lies between 10° C. and 90° C., in particular between 15° C. and 25° C.

The invention therefore involves in particular a method for producing an optical glass element, in particular a monolithic glass substrate, by an embossing material being used, which material can be embossed at temperatures of less than 500° C., in particular ambient temperature, and being converted by a subsequent heat treatment into, at least approximately, pure glass, in particular silicon dioxide.

In other words, the process according to the invention uses an embossing material, in particular a low-viscosity gel, which is converted in particular into silicon oxide or silicon dioxide only by a subsequent process step. As a result, it is advantageously possible according to the invention to produce an optical glass element economically, quickly, and with moderate use of chemicals.

The optical glass element is in particular a glass lens, especially preferably a monolithic glass lens wafer. Although in subsequent text, mention is made of a monolithic glass substrate, the idea according to the invention can also be used for the production of individual optical elements on a carrier substrate, in particular by step-and-repeat processes. In addition, the method according to the invention is not limited to the use of chemicals, from which glass, in particular silicon dioxide, is formed by the process according to the invention. The embodiment according to the invention is much more applicable to all types of chemicals that can be embossed at low temperatures and that are chemically converted by a chemical and/or physical process, in particular a heat treatment.

The Die

In order to perform the embossing (structuring) of the embossing material, special embossing dies are required. The embossing dies must correspond to extremely high requirements so that their micrometer- and nanometer-sized structures can be transferred without error into the embossing material as a negative. In principle, a distinction is made between a hard die and a soft die. A hard die is comprised in particular of metal, glass, or ceramic. It is less deformable, corrosion-resistant, and wear-resistant. The surface of the hard die is treated in particular by electron beam lithography or laser beam lithography. The advantage of the hard die lies primarily in the high level of wear resistance. A soft die is molded in particular as a negative of a hard die. It is comprised in particular of a polymer, has a high level of elasticity, and a low bending strength. It is in particular entropy-elastic (rubber-elastic). The reason is primarily a high level of adhesion between the embossing material and the soft die and/or a swelling of the soft die. Soft dies can be distinguished from hard dies by different chemical, physical and technical parameters. A differentiation based on the elasticity behavior would be conceivable. Soft dies have a deformation behavior that is predominantly based on entropy elasticity, and hard dies have a deformation behavior that is predominantly based on energy elasticity. In addition, the two types of dies can be distinguished by, for example, their hardness. Hardness is the resistance that a material puts up against a penetrating body. Since hard dies are comprised in particular of metals or ceramics, they have a correspondingly high hardness value. There are various possible ways of indicating the hardness of a solid. A very common method is the indication of hardness according to Vickers. Hard dies can have in particular Vickers hardnesses of greater than 500 HV.

Especially advantageous for a demolding is a combination of a hydrophobic die surface and a hydrophobic surface of the embossing material according to an advantageous embodiment of the invention. Hydrophilicity is defined as the high capacity of the surface of a substance for interaction with water. Hydrophilic surfaces are predominantly polar and interact correspondingly well with the permanent dipoles of the molecules of fluids, preferably with water. The hydrophilicity of a surface is quantified in particular by means of a contact angle measuring device. In this case, hydrophilic surfaces have very small contact angles. If the embossing material according to the invention has to have a hydrophilic surface in order to be able to be demolded from the die as simply as possible, then the following ranges of values are to apply according to the invention: a hydrophilic surface has a contact angle of smaller than 90°, preferably smaller than 60°, more preferably smaller than 40°, even more preferably smaller than 20°, and with utmost preference less than 1°.

Hydrophobicity is correspondingly defined as the low capacity of the surface of a substance for interaction with water. Hydrophobic surfaces are predominantly nonpolar and hardly interact with the permanent dipoles of the molecules of fluids. If, in one embodiment of the invention, the embossing material according to the invention has a hydrophobic surface in order to be able to be demolded from the die as simply as possible, the following ranges of values according to the invention are then to apply: a hydrophobic surface has a contact angle of greater than 90°, preferably greater than 100°, more preferably greater than 120°, even more preferably greater than 140°, and with utmost preference greater than 160°.

The Embossing Material

The idea according to the invention comprises in particular in using a special embossing material, which is present as a liquid at ambient temperature. The embossing material is in particular a colloidal dispersion. A colloidal dispersion is defined as a heterogeneous amount of two substances, in which the quantitatively smaller amount of substance from particles lies in the range of sizes of between approximately 1 nm and 500 nm. The embossing material is present as a liquid at ambient temperature and can polymerize by chemical and/or physical processes, in particular by the action of photons, radicals, heat, acids and/or lye.

The embossing material can have in particular silicon and oxygen. These embossing materials can be easily deformed based on their liquid aggregate state and therefore can also be embossed. After the successful deformation, the conversion of the liquid embossing material is carried out in a solid, in this case in particular in, at least approximately, pure silicon dioxide or silicon oxide.

The invention is now based in particular on the idea of using a corresponding embossing material for the production of multiple glass lenses, in particular a glass lens wafer. In this case, the embossing material is embossed in its liquid state and thus correspondingly structured. Then, a hardening process, generated in particular thermally and/or by photons, in which a first cross-linking of the embossing material takes place, is carried out. Because of this cross-linking process, the embossing material is dimensionally stable. After achieving dimensional stability, the die can be removed from the embossing material.

In addition to the production method, the invention therefore also describes an embossing material for the embossing lithography as well as applications/uses of the embossing material according to the invention. The embossing material is distinguished in particular by a mixing of at least one main component, preferably comprising inorganic and/or organic parts, and at least one secondary component that is suitable/used in particular for setting the property of the embossing material for interaction with water, preferably an organic component. A main component is defined as a component that contributes to a predominant extent to the creation of the final embossed shape. A secondary component is defined as all other components that are mixed with the main component; these include in particular those organic components by means of which hydrophilicity or hydrophobicity according to the invention is set/affected, initiators, and solvents. The embossing material can therefore also be comprised of multiple main components and/or multiple secondary components. A precise description of the preferred embossing material according to the invention is found in, for example, the patent specification PCT/EP2013/062711, whose disclosure content relative to the embossing material is to be cited explicitly in the specification of this invention. In principle, however, all materials from which glass can be generated are suitable.

The above-mentioned embossing material is therefore a preferred embossing material for generating the monolithic glass substrate. The use of any other suitable material is also conceivable.

A preferred embodiment includes the embossing of embossing material to form a monolithic substrate at ambient temperature. The embossing process itself takes place at temperatures of less than 500° C., preferably less than 400° C., more preferably less than 300° C., most preferably less than 200° C., with utmost preference less than 100° C., and even more preferably at ambient temperature. The thus obtained monolithic substrate is then heat-treated. The heat treatment is a sintering process, in which the embossing material is compressed. The sintering process can take place either before and/or after the demolding of the embossing material from the embossing die. Preferably, however, the embossing process and heat treatment are separated from one another in order to achieve an increase in throughput. Especially preferably, therefore, the embossing unit is used only for embossing, while the embossed monolithic substrates are sintered in an external heat-treatment unit, in particular a furnace, especially preferably a continuous furnace. In this case, the sintering process takes place at temperatures of greater than 50° C., preferably greater than 100° C., more preferably greater than 300° C., most preferably greater than 500° C., with utmost preference greater than 700° C., and even more preferably greater than 900° C.

The sintering is preferably carried out in a heat-treatment unit. In a quite preferred embodiment, the heat-treatment unit is a unit that has a microwave source. The glass element or monolithic substrate that is to be sintered in this case makes contact with a structural element that can be excited by microwaves and that is heated by microwaves, so that the monolithic substrate is heated and sintered. Especially preferably, the structural element is the upper and/or lower embossing die. As a result, according to the invention, an extremely compact unit is disclosed, which is suitable for embossing the monolithic substrate, as well as for the sintering of the same by the action of microwaves. As an alternative, the direct heating of the monolithic substrate by microwaves is conceivable if the embossing material can be excited directly by microwaves.

Another especially preferred process according to the invention takes place during the sintering process of the embossing material. In this state, it results in shrinkage of the embossed monolithic substrate. Based on the predominantly amorphous microstructure, the shrinkage occurs homogeneously, however. The difference between the number one and the ratio between the volume after the shrinkage and the starting volume is referred to as the shrinkage factor f. The percentage of shrinkage is called the 100-multiplied shrinkage factor. The percentage of shrinkage is thus 0% before the sintering. According to the invention, there are two different possibilities of using the percentage of shrinkage.

In an exemplary embodiment according to the invention, the percentage of shrinkage is kept as low as possible by the correct selection of the embossing material, as well as the corresponding parameters of the sintering process.

First, an in particular monolithic substrate is generated, whose percentage of shrinkage is less than 2%, preferably less than 1%, even more preferably less than 0.1%, most preferably less than 0.01%, and all the more preferably less than 0.001%. Because of the low percentage of shrinkage factor, the in particular monolithic substrate preferably differs very little or not at all from the die form. As a result, it is unnecessary according to the invention to consider the shrinkage even at the die design stage. For this purpose, the production process is advantageously considerably simplified.

In another preferred embodiment, the shrinkage is used for smoothing the surface of the monolithic substrate. The embossing material is very greatly compressed by the shrinkage process during the sintering process. The compressing is based, on the one hand, on an outgassing process of possible substituents; on the other hand, and predominantly, however, it is based on a chemical cross-linking process. Owing to the cross-linking process, atoms are cross-linked in the end and primarily homogeneously and therefore in a like manner in all directions in space by forming covalent, chemical bonds with one another. This network that forms from predominantly very strong silicon-oxygen compounds results in an increase in the density of the embossing material and in the actual conversion into the solid, at least predominantly silicon-oxide-containing material, glass. This compressing process takes place not only inside the embossing material but also on its surface. As a result, the rough spots are correspondingly smoothed, which leads to an increase in the quality of the optical elements, which are present on the monolithic substrate. The rougher the surface of an optical element, in particular a lens, the larger the diffuse portion of scattered light, which does not contribute at all to the desired optical imaging. As a result, the photon yield drops as roughness increases. In the case of lenses, this results in a decreasing contrast of the image, which is recorded and further processed by an image sensor that is mounted behind the lens. An increase in the intensity yield thus occurs due to the process of the shrinkage, which process is exploited according to the invention in a targeted manner, and the process of the accompanying smoothing of the surface of the optical elements, in particular the lenses.

A special aspect according to the invention is the removal of all compounds that should not be present in the embossing material, for example a monolithic substrate, in particular gases and/or additives generated before and/or during the sintering process. After the end of the process according to the invention, a final concentration of such gases and/or additives is in particular lower than 100 ppm, less than 10 ppm, preferably less than 1 ppm, even more preferably less than 100 ppb, and all the more preferably less than 1 ppb.

Another aspect according to the invention is the specific setting of the residual stress in the embossing material. After the sintering process, the residual stress in the embossing material lies in particular between 1,000 MPa, and −1,000 MPa, preferably between 500 MPa and −500 MPa, even more preferably between 250 MPa and −250 MPa, and most preferably around 0 MPa. Compressive stress is referred to with a negative sign; tensile stress is referred to with a positive sign. Preferably; the embossing material is therefore free of residual stress after the sintering process. A residual-stress-free sintering product is less susceptible to damage by residual stress. At times, it may be desirable or necessary, however, to introduce residual compressive stress in order to counteract a tensile load, applied from the outside, which may be present in a case of use. In this case, compressive stress of more than −100 MPa, preferably more than −250 MPa, even more preferably more than −500 MPa, and even more preferably of more than −1,000 MPa is desired. The residual stress can be set in particular by thermal influencing and by a corresponding heating profile during sintering and the cooling following after that.

Further advantages, features and details of the invention will emerge from the subsequent description of preferred embodiments as well as based on the drawings.

BRIEF DESCRIPTION OF DRAWINGS

In the various figures, the same parts are always provided with the same reference numbers and are therefore in general also in each case named or mentioned only once.

DETAILED DESCRIPTION OF INVENTION

Figure 1A:
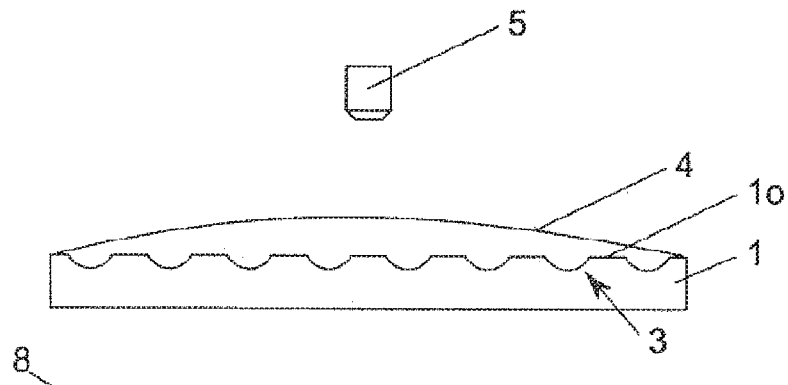
FIG. 1a a diagrammatic cross-sectional depiction of a first process step of an exemplary embodiment of the method according to the invention, FIG. 1b a diagrammatic cross-sectional depiction of a second process step of an exemplary embodiment of the method according to the invention, FIG. 1c a diagrammatic cross-sectional depiction of a third process step of an exemplary embodiment of the method according to the invention, FIG. 1d a diagrammatic cross-sectional depiction of a fourth process step of an exemplary embodiment of the method according to the invention, FIG. 1e a diagrammatic cross-sectional depiction of a fifth process step of an exemplary embodiment of the method according to the invention, FIG. 2 a diagrammatic cross-sectional depiction of an optical glass element according to an exemplary embodiment, FIG. 3a a magnified, diagrammatic cross-sectional depiction of a substrate according to an exemplary embodiment before the sintering process, FIG. 3b a magnified, diagrammatic cross-sectional depiction of a substrate according to another exemplary embodiment before the sintering process, FIG. 3c a magnified, diagrammatic cross-sectional depiction of an optical glass element according to an exemplary embodiment after the sintering process.

FIG. 1a shows a diagrammatic depiction of a first process step of an exemplary embodiment according to the invention, in which an embossing material 4 is dispensed by a dispensing unit 5 onto the embossing die surface 1o of the lower embossing die 1. The embossing material 4 can be applied by a so-called pool deposition (puddle dispense). In this case, embossing material 4 is deposited on the embossing die surface 1o by the dispensing unit 5 until the embossing material 4 covers the majority of the embossing die surface 1o. It is also conceivable that a complete covering is carried out only in an additional process step. The embossing material can be applied in particular by centrifugal enameling processes and/or spray-enameling processes. During dispensing, the degree of coverage of the embossing die surface 1o is more than 20%, preferably more than 40%, more preferably more than 60%, most preferably more than 80%, and with utmost preference 100%.

By further processes such as, for example, the centrifugal enameling (spin coating), the degree of coverage can again be increased or the embossing material layer thickness t can be homogenized relative to the site. An application of the embossing material 4 on the embossing die surface 1o by a spray enameling device (spray coater) is also conceivable. In another embodiment, not depicted, the embossing material 4 is not applied as a pool, but rather in the form of multiple small, distributed drops, which have, however, sufficient embossing material 4 to agglomerate in subsequent processes and to form a corresponding monolithic substrate. The advantage of the application of drops in this case lies primarily in the possibility of a more homogeneous distribution of the embossing material 4. Also, the drops of embossing material 4 distributed by the application of drops can be distributed by a subsequent centrifugal enameling process over the embossing die surface 1o and can agglomerate as early as in this process step. The deposition of individual drops is also conceivable, however, in order to emboss optical units that are separated from one another. Such a process is described in the publication WO2013/178263A1.

Figure 1B:
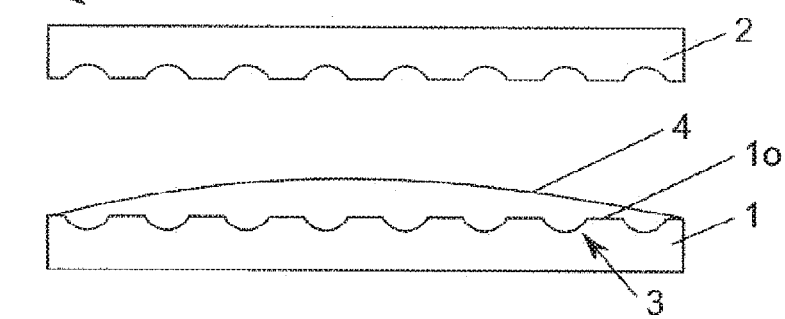

In an exemplary second process step, depicted in FIG. 1b, a second embossing die 2 is aligned with the first embossing die 1. In this case, the alignment of the two embossing dies is preferably carried out via multiple (not indicated) alignment marks on the embossing dies 1 and 2. Two alignment marks, opposite in each case, at at least two different positions that lie preferably as far as possible on the edge are aligned with one another by corresponding alignment units.

Figure 1C:
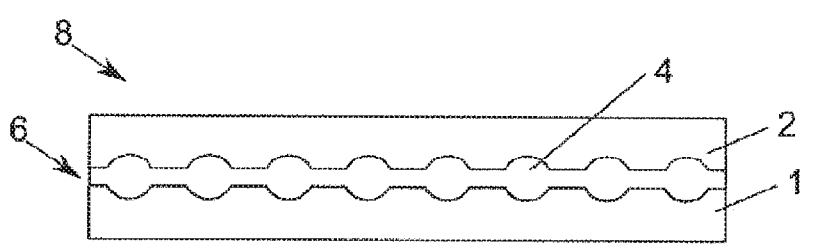
Figure 1D:
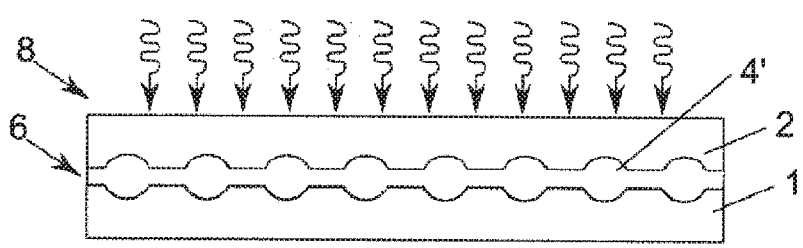

In an exemplary third process step that is depicted in FIG. 1c, an embossing of the embossing material 4 is carried out by a converging of the two embossing dies 1 and 2. In this case, the embossing material 4 is pressed into the embossing forms 3 of the upper embossing die 2 and/or the lower embossing die 1. In another exemplary process step that is depicted in FIG. 1d, a hardening of the embossing material 4 is carried out between the two embossing dies 1 and 2. In this case, the hardening can be carried out either by means of heat, photons, electric current, chemicals such as acids and bases, or any other type of chemical and/or physical exposure. Thermal and electromagnetic methods are especially preferred.

With the thermal method, heat is transported via the upper embossing die 2 and/or the lower embossing die 1 to the embossing material 4. The thermal initiators within the embossing material 4 start the polymerization process of the embossing material 4 above a critical temperature $T_k$. In this case, the critical temperature is greater than ambient temperature, preferably greater than 100° C., more preferably greater than 200° C., most preferably greater than 300° C., most preferably greater than 400° C., and even more preferably greater than 500° C.

In an electromagnetic method, the embossing material 4 is illuminated by an intensive electromagnetic radiation, in particular UV light. In this case, the electromagnetic radiation shines through the upper embossing die 2 and/or the lower embossing die 1. The transilluminated embossing die 1 and/or embossing die 2 must accordingly be transparent for the electromagnetic radiation. The preferred wavelength range of the electromagnetic radiation lies between 1 nm and 10,000 nm, preferably between 10 nm and 1,000 nm, more preferably between 100 nm and 500 nm, and most preferably between 200 nm and 500 nm.

Figure 1E:
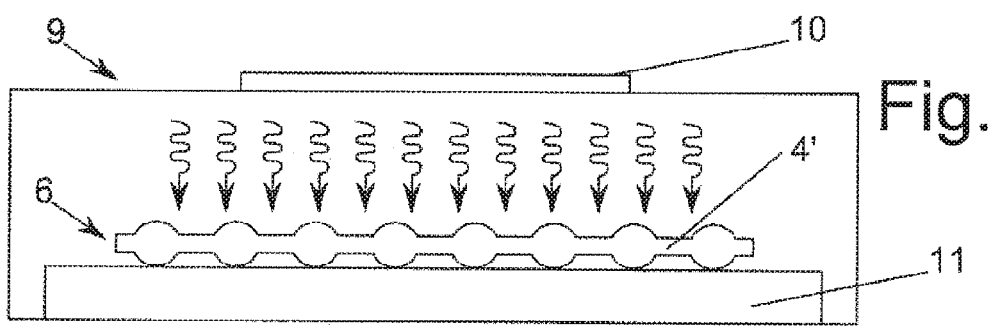

After the hardening of the embossing material 4, a dimensionally stable, solid embossing material 4' is already present in the form of a monolithic substrate 6. The monolithic substrate 6 is sintered again for converting the embossing material 4' into the glass material 7. FIG. 1e shows a fifth process step of an exemplary embodiment. The sintering is preferably done outside of the embossing device 8. According to the invention, a separation of the embossing process and the sintering process is thus also performed, which can have a positive effect on the throughput. Especially preferably, namely the embossing device 8 is always used only for embossing, and a corresponding sintering device 9 is used only for sintering. The sintering device 9 is, for example, a furnace, even more preferably a continuous furnace. Especially preferably, the sintering unit 9 uses a microwave source 10. The microwave source 10 is used to heat either the material 4' of the monolithic substrate 6 directly or a structural element 11, in particular a specimen holder 11, which is thermally coupled as efficiently as possible to the monolithic substrate 6. The thermal coupling exists either via direct contact of the monolithic substrate 6 to the structural element 11 or via a gas that conducts heat as efficiently as possible. In special embodiments, it may be useful to combine the embossing device 8 and the sintering device 9 with one another. As a result, it is possible according to the invention to perform the embossing process and the sintering process in one and the same unit.

Figure 2:
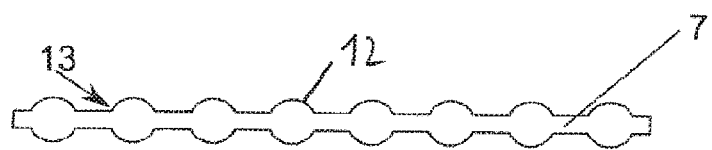

FIG. 2 shows an exemplary embodiment of an optical glass element 13 that is comprised of multiple optical subcomponents 12. In special cases, the optical subcomponents 12 are biconvex lenses. The optical subcomponents 12 could, however, just as well be, for example, biconcave, convex-concave or concave-convex lenses. In addition, it is conceivable that the optical subcomponents 12 are diffraction lattices, any other type of optical element, or any other type of glass structural element.

Figure 3A:
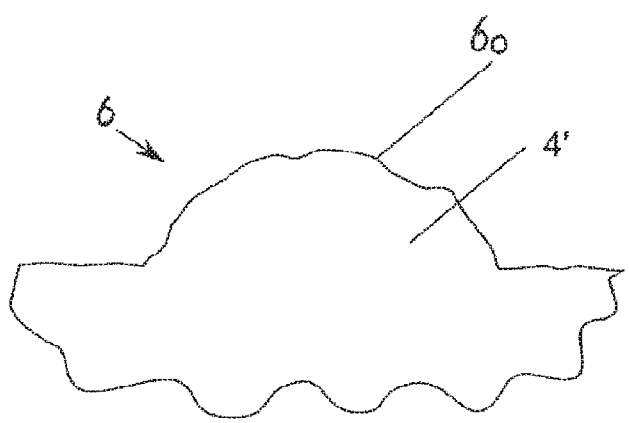
Figure 3B:
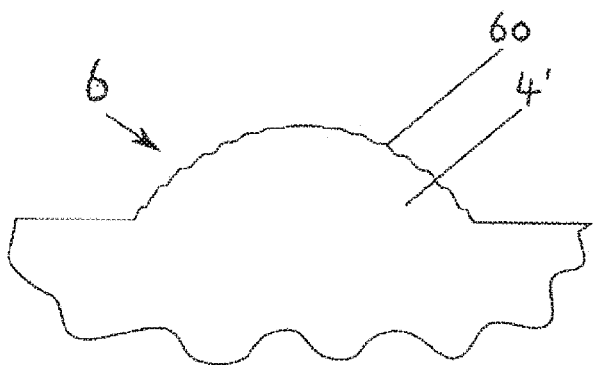
Figure 3C:
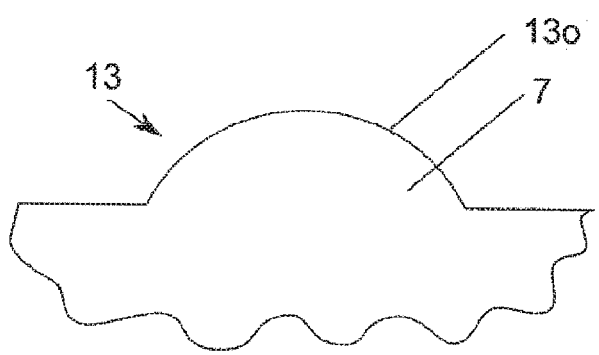

In each case, FIGS. 3a and 3b show a magnified depiction of an exemplary monolithic substrate 6 before the sintering process. FIG. 3c shows an exemplary optical glass element 13 that is comprised of glass material 7 after the sintering process with an almost ideal surface 13o. The monolithic substrates 6 are comprised of the dimensionally stable but not yet sintered material 4'. FIG. 3a shows a magnified depiction of a monolithic substrate 6 with a statistically roughened surface 6o. FIG. 3b shows a magnified depiction of another monolithic substrate 6 with a well-defined surface 6o that deviates systematically from the ideal form 13o. The surface 6o could be produced, for example, as a negative of an embossing form 3 of an embossing die 1 or an embossing die 2. Provision can be made in particular for suitably designing and building the surfaces 3o of the embossing forms 3 namely in the middle of the desired form but for configuring their short-range ordering in steps.

The shrinkage process results in an in particular light smoothing of the surface 6o or the stepped structuring 6o of the substrate 6. It is therefore a preferred aspect according to the invention to influence the shrinkage process by the structuring of the surface 6o, in particular by a stepped structuring. Preferably, the structuring of the surface 6o influences the shrinkage process to the extent that as smooth as possible a surface 13o'' is produced according to FIG. 3c. This smoothing is a surface effect of the compressing of the material 4' that takes place in particular throughout the volume.

LIST OF REFERENCE SYMBOLS

1 Lower embossing die
1o Embossing die surface of the lower embossing die
2 Upper embossing die
3 Embossing form
4, 4' Embossing material
5 Dispensing unit 6 Monolithic substrate
6o Surface
7 Glass material
8 Embossing device
9 Sintering device
10 Microwave source
11 Structural element
12 Optical subcomponent
13 Optical element
13o Surface Having described the invention, the following is claimed:

1. A method for the production of an optical glass element, comprising:
   a) applying a liquid embossing material on an embossing die, the liquid embossing material containing additives added thereto,
   b) embossing the applied embossing material at a temperature of less than 500° C.,
   c) hardening the embossed embossing material in the embossing die such that the hardened embossing material is dimensionally stable,
   d) sintering the dimensionally stable embossing material and thus executing the primary forming of the optical glass element, whereby a reduction of a surface roughness of the optical glass element takes place during the sintering, and
   e) before and/or during the sintering, removing:
      1) gases generated before and/or during the sintering; and/or
      2) the additives added to the liquid embossing material, wherein the gases and/or the additives are removed such that a final concentration of the gases and/or the additives is lower than 100 ppm.

2. The method according to claim 1, wherein the embossing is carried out in step b) at a temperature of less than 400° C.

3. The method according to claim 1, wherein after step a), a degree of coverage of the applied embossing material on an embossing die surface of the embossing die is more than 20%.

4. The method according to claim 1, wherein the liquid embossing material is applied in the form of multiple small, distributed drops on an embossing die surface of the embossing die.

5. The method according to claim 1, wherein the embossing of the applied embossing material is carried out in step b) by converging said embossing die and a second embossing die.

6. The method according to claim 5, wherein said embossing die is a lower embossing die and the second embossing die is an upper embossing die.

7. The method according to claim 1, wherein the hardening of the embossed embossing material is carried out in step c) by a thermal method, whereby heat is transported to the embossed embossing material, and a polymerization process of the embossed embossing material starts above a critical temperature $T_k$, the critical temperature $T_k$ being between 0° C. and 1,000° C.

8. The method according to claim 1, wherein the hardening of the embossed embossing material is carried out in step c) by an electromagnetic method, whereby the embossed embossing material is irradiated by an electromagnetic radiation.

9. The method according to claim 8, wherein the electromagnetic radiation is UV light.

10. The method according to claim 8, wherein a wavelength range of the electromagnetic radiation is between 1 nm and 10,000 nm.

11. The method according to claim 1, wherein steps a), b) and c) are performed in an embossing device, and the sintering is performed in step d) in a sintering device that is separated from the embossing device.

12. The method according to claim 1, wherein the sintering is carried out in step d) by microwave radiation.

13. The method according to claim 1, wherein the sintering is carried out in step d) in a furnace, whereby the temperature during sintering is greater than 50° C.

14. The method according to claim 13, wherein the furnace is a continuous furnace.

15. The method according to claim 1, wherein the liquid embossing material has at least one of the following components:
   Polyhedral oligomeric silsesquioxane (POSS),
   Polydimethylsiloxane (PDMS),
   Tetraethyl orthosilicate (TEOS), and
   Poly(organo)siloxane silicone.

16. The method according to claim 1, wherein the embossing is carried out in step b) at a temperature less than 300° C.

17. The method according to claim 1, wherein the embossing is carried out in step b) at a temperature less than 200° C.

* * * * *